United States Patent [19]

Marcilly et al.

[11] Patent Number: 5,008,000
[45] Date of Patent: Apr. 16, 1991

[54] CRACKING CATALYST FOR HYDROCARBON CHARGES COMPRISING AN OFFRETITE, A ZEOLITE AND A MATRIX

[75] Inventors: Christian Marcilly, Houilles; Jean-Marie Deves; Francis Raatz, both of Rueil Malmaison, all of France

[73] Assignee: Institut Francais du Petrole, Rueil-Malmaison, France

[21] Appl. No.: 493,601

[22] Filed: Mar. 15, 1990

Related U.S. Application Data

[62] Division of Ser. No. 154,258, Feb. 10, 1988.

[30] Foreign Application Priority Data

Feb. 11, 1987 [FR] France .................................. 87 01802
Nov. 30, 1987 [FR] France .................................. 87 16691

[51] Int. Cl.$^5$ .............................................. C10G 11/05
[52] U.S. Cl. ........................................ 208/120; 502/67
[58] Field of Search ............................. 208/120; 502/67

[56] References Cited

U.S. PATENT DOCUMENTS

| | | | |
|---|---|---|---|
| 3,894,935 | 7/1975 | Owen | 288/120 |
| 3,925,191 | 12/1975 | Burgess | 208/120 |
| 3,925,195 | 12/1975 | Scherzer et al. | 208/135 |
| 4,847,224 | 7/1989 | Fajula et al. | 423/328 |

*Primary Examiner*—Anthony McFarlane
*Attorney, Agent, or Firm*—Millen, White & Zelano

[57] ABSTRACT

The cracking catalyst of the invention contains:

(a) 20–95% by weight of at least one matrix, selected from the group consisting of alumina, silica, magnesia, clay, titanium oxide, zirconia, combinations of at least two of these compounds and alumina-boron oxide combinations, (b) 1–60% by weight of at least one zeolite of open structure whose main dodecagonal channels have openings of at least 7 Angströms, said zeolite of open structure being selected from the group formed of X, Y, L, omega and beta zeolites, (c) 0.5–60% by weight of at least one offretite whose main dodecagonal channels have openings smaller than 7 Angströms and which have a $SiO_2/Al_2O_3$ molar ratio from about 15 to about 500, the crystalline paramaters a and c of elementary mesh ranging respectively from 1.285 to 1.315 nm for a and from 0.748 to 0.757 nm for c and have a potassium content lower than 1.5% by weight.

12 Claims, No Drawings

CRACKING CATALYST FOR HYDROCARBON CHARGES COMPRISING AN OFFRETITE, A ZEOLITE AND A MATRIX

This is a division of application Ser. No. 154,258, filed Feb. 10, 1988.

The present invention concerns a hydrocarbon charge conversion catalyst comprising a zeolite of open structure, associated with a stabilized and dealuminated offretite and an amorphous or insufficiently crystallized matrix.

The catalyst according to the present invention is particularly well adapted to the cracking of oil fractions in order to produce a substantial amount of propylene, in particular to the cracking of heavy oil fractions.

The present invention also concerns a process for cracking oil charges, particularly heavy oil charges, in the presence of the above-defined catalyst, as well as processes for manufacturing said catalyst.

BACKGROUND OF THE INVENTION

The introduction of the catalytic cracking process in the oil industry at the end of the thirties was a determinant progress with respect to the prior techniques, by providing for highly improved yields of high-grade motor gasoline. The various processes operating in fixed bed (e.g. HOUDRY processes) have been rapidly supplanted by moving bed processes and, particularly since the middle of the forties, by those of the fluid bed type (fluid catalytic cracking, in short FCC). At the very beginning, the catalytic cracking processes were used nearly exclusively for treating vacuum distillates (VD) of low sulfur content that are relatively light (final boiling point lower than 540°-560° C.).

The cracking of these charges is generally conducted at about 500° C. under a total pressure close to atmospheric pressure and in the absence of hydrogen. In these conditions the catalyst becomes quickly covered with coke and it is constantly necessary to regenerate it. In cracking processes of the fluid bed type (FCC) or of the moving bed type (such as TCC) the catalyst permanently circulates between the reaction zone where it resides about a few seconds to several tens of seconds, and the regenerator where it is freed of coke by combustion between about 600° and 750° C. in the presence of diluted oxygen.

The fluid bed (FCC) units are now used more extensively than those of the moving bed type. The catalyst circulates therethrough in a fluidized state as particles of average diameter ranging from 50 to 70 microns, the granulometry of said powder ranging approximately from 20 to 100 microns.

The catalysts used in the first FCC units were solids of high silica content obtained by acid treatment, either of natural clays or of synthetic silica-aluminas. The main progress in FCC achieved up to the end of the fifties was, in particular:

the use of the spray drying technology for preparing catalysts in the form of fine spherical particles more easily fluizidable and more resistant to attrition than the powder obtained by crushing, the synthesis of silica-aluminas, initially containing a high (about 85% by weight) silica and a low alumina (Lo-Al) proportion and then a high alumina (Hi-Al) content, with about 75% of $SiO_2$, and various very substantial improvements concerning metallurgy and equipment design, particularly for regeneration.

It is only at the beginning sixties that a major advance took place in the field of catalytic cracking, by the use of molecular sieves and more particularly of the zeolite of the faujasite structure, first in a moving bed process, then, a little later, in the FCC process. These zeolites, incorporated with a matrix mainly consisting of amorphous silica-alumina and optionally containing variable proportions of clay, are characterized by cracking activities for hydrocarbons about 1000 to 10000 times those of the first catalysts used. The availability on the market of these new zeolite catalysts has completely changed the cracking process by the very substantial gain of activity and of selectivity to gasoline and also by considerable modifications in the unit technology, particularly:

cracking in the riser (tube wherein the catalyst and the charge flow upwardly), decrease of the contact time, modification of the regeneration techniques.

These three points will be further examined hereinafter.

The X zeolite (faujasite structure) characterized by a $SiO_2/Al_2O_3$ molar ratio from 2 to 3 has been first used. Exchanged to a large extent with rare-earth ions, it is highly active and has a high thermal and hydrothermal resistance.

Towards the end of the sixties, this zeolite has been progressively replaced by Y zeolite which tends to produce slightly less coke and whose thermal and hydrothermal resistance was much improved. Presently, a major part of the proposed catalyst (probably more than 90%) contain an Y zeolite exchanged with rare-earth ions and/or ammonium ions.

From the beginning of the sixties the oil industry began to suffer from a shortage of available crude oil, whereas the demand for gasoline of high octane number was continuously increasing. Moreover, the available supply was progressively oriented towards heavier and heavier crude oils. The treatment of the latter raised difficult problems for the refiner in view of their high content of catalyst poisons, particularly nitrogenous compounds and metal compounds (mainly nickel and vanadium), their exceptional Conradson carbon and overall asphaltene compound values.

The necessity to treat heavier charges and other more recent problems such as: the progressive but general elimination of lead-containing additives, the slow but substantial evolution in various countries of the demand for middle distillates (kerosene and gas-oil), have induced the refiners to make searches for finding improved catalysts whereby the following objects can be met:

to obtain thermally and hydrothermally more stable catalysts, also more tolerant of metals, to reduce the amount of coke formation at equal conversion rate, to obtain a gasoline of higher octane number, to improve the selectivity to middle distillates.

It is mostly desirable to reduce the production of light gases comprising compounds of 1–4 carbon atoms and accordingly the catalysts are so designed as to limit the production of such light gases. But in certain countries, particularly in certain developing countries, the demand for these products or for some of them, particularly propylene, may be high. The catalytic cracking process may meet to a certain extent such a demand, provided that the catalyst be particularly adapted to said production.

An efficient way for adapting the catalyst consists of adding to the conventional catalyst masses an active agent having the two following properties of:
1. Cracking heavy molecules with a good selectivity to $C_3$ hydrocarbons, particularly propylene,
2. Sufficiently resisting to the severe conditions of steam partial pressure and of temperature prevailing in a regenerator of an industrial cracking unit.

As a matter of fact, in view of the tendency of the present charges to produce more and more coke which deposits onto the catalysts, and of the higher sensitivity to coke of zeolite performance, the present research has as an object not only finding catalysts less selective to coke, but also to further catalyst regeneration in order to reduce to a minimum the coke amount at the end of the combustion. In many processes, this is achieved by increasing the regenerator temperature.

Consequently, the regenerator is subjected to high steam partial pressures, ranging from 0.2 to 1 bar (1 bar=0.1 MPa), and to local temperatures at the catalyst level of 750°–850° C. or even 900° C., for a few tens of seconds to a few minutes. In these conditions the zeolite, which is the main active agent of the catalyst, may rapidly lose a large part of its activity due to the irreversible degradation of its structure. In spite of various artful techniques developed during the last years for limiting the regenerator temperature (addition of coils to remove heat by producing steam or intermediary cooling of the catalyst) or for limiting the steam content at high temperature (a technique using two regenerators as that used in the R2R process of TOTAL-IFP), the zeolite present in the cracking catalyst must necessarily have an excellent thermal and hydrothermal stability.

SUMMARY OF THE INVENTION

Among the zeolites which might be used to obtain a catalyst having the above-mentioned required properties, it has surprisingly been discovered that a stabilized and dealuminated offretite provides a catalyst clearly superior to that obtained for example with one of the following zeolites which, a priori, could have been considered as possibly interesting and which have been surveyed during the work which has led to the present invention:

erionite of T erionite: these zeolites have a good selectivity for producing $C_3$ hydrocarbons, but their hydrothermal stability is clearly not so good as that of offretite and, in addition, they suffer from the disadvantage of having too closed a pore structure, making them inefficient for the conversion of certain bulky hydrocarbon molecules, such for example as isoparaffins, naphthenes and alkylaromatics.

ZSM5: this zeolite, hydrothermally very stable, is insufficiently selective for the production of $C_3$ hydrocarbons, as shown in one of the examples given hereinafter.

Ferrierite: this zeolite is hydrothermally very stable, but its pore structure is clogged at high temperature, in the presence of steam, by extensive extraction of aluminum atoms from the aluminosilicate structure. As a matter of fact, these extracts are housed in the micropores, thus blocking the access to the molecules, and they cannot be substantially removed by chelating or acid treatments. Moreover, when it still has a slight activity, ferrierite leads to a too large proportion of $C_1$ or $C_2$ hydrocarbons to be of interest.

Mordenite: this zeolite is hydrothermally very stable and easy to stabilize and to dealuminate, but its selectivity for the production of $C_3$ hydrocarbons is clearly insufficient.

The stabilized and dealuminated offretite used for manufacturing the catalyst according to the invention is obtained by modifying treatments providing for the possibility to adjust at will the aluminum and silicon composition of its aluminosilicate structure. Its manufacture has been disclosed in European patent 190,949 whose description is incorporated herein by way of reference.

The modifying treatments constitute one of the rare means, other than synthesis, for obtaining zeolites of highly increased silica content.

Zeolites pertaining to other groups than pentasils or related groups (mordenite group) such as Y zeolites, omega zeolite (or mazzite), erionite, offretite, chabazite, etc.. can only be obtained exceptionally with $SiO_2/Al_2O_3$ ratios higher than 12-15, by hydrothermal synthesis.

The modifying treatments for substantially changing the composition of the aluminosilicate structure, are highly recommended for adjusting the acid properties of zeolites and improving their performance.

According to the present invention, zeolites of the modified acid offretite type have been used to prepare a cracking catalyst for hydrocarbon charges whereby an improved selectivity for the production of $C_3$ hydrocarbons, particularly propylene, may be obtained.

The offretite is a natural or synthetic zeolite pertaining to the chabazite group. Its structure was long considered as identical to that of erionite, zeolite of the same family, due to their similar X-ray diffraction spectra (HEY M. H. & FEJER E. E, Min. Mag. 33, 66, 1962). However, these two structures are different:

1—the hexagonal mesh of the offretite has a size along c axis which is one half of that of erionite (BENNET J. M. & GARD J. A., Nature 214, 1005, 1967), and also the odd lines 1 of erionite X-ray diffraction spectra are absent from the offretite spectra (GARD J. A. & TAIT J. M., Molecular Sieve Zeolites-1, Advan. Chem.,Ser. 101, 230, 1971);

2—the piling sequences of the two zeolites are different (WHYTE T. E. Jr., WU E. L., KERR G. T. & VENUTO P. B., J. Catal. 20, 88, 1971). Thus the offretite has a much more open structure than erionite. Piling defects may occur in these structures, giving rise to the formation of T errionite, which is a zeolite of offretite structure with piling defects of the erionite type.

The offretite structure has been specified by many authors. This zeolite is formed of two types of columns: columns of 14 face-gmelinite cages of about 3.6 Angström diameter and columns of 11 face-concrenite cages alternating with hexagonal prisms. These columns are oriented along the c axis and lead to the formation of two types of channels large dodecagonal channels parallel to the c axis, of diameter ranging from 6 to 7 Angströms (1 Angström=$10^{-10}$ m) and octagonal channels perpendicular to the c axis.

Offretite is mostly synthesized in the presence of tetramethylammonium($CH_3)_4N^+$- or TMA- and potassium $K^+$ ions. The molar $SiO_2/Al_2O_3$ ratios generally range from 4 to 10. From the above-described structure, four locations are possible for these cations: the hexagonal prisms, the cancrinite cages, the gmelinite cages and the large channels. The distribution of these cations is as follows (AIELLO R., BARRER R. M., DAVIES J. A. & KERR I. S., Trans. Faraday Soc. 66, 1610, 1970; AIELLE R. & BARRER R. M., Chem. Soc. (A), 1470,1970): the potassium ions are located in the hexagonal prisms, the concrenite cages and eventually in the large channels; the TMA ions, more bulky, are located in the gmelinite cages and in the large channels. This distribution results in the following theoretical exchanges: TMA or K+ ions located in the large channels are accessible, and exchangeable, whereas the TMA cations located in the gmelinite cages are "trapped", hence unexchangeable; the potassium ions located in the concrenite cages are a priori accessible, hence exchangeable; on the contrary, those located in the hexagonal prisms are inaccessible, hence unexchangeable.

Presently, the direct synthesis of offretite of high silica content is not possible. Modifications of this solid, i.e. dealumination, must be used.

Dealuminated offretite

It is possible, from a K-TMA offretite of silica-to-alumina molar ratio from 4 to 10 (or 6 to 10), whose X-ray diffraction diagram and crystalline parameters are those reported in table A, to obtain an offretite of high silica content, whose silica-to-alumina molar ratio is preferably much higher than 10, by performing cycles of thermal treatments - liquid phase treatments. These thermal treatments are conducted at temperatures from 400° to 900° C. The liquid phase treatments consist either of cation exchanges or of acid etchings. The process must comprise at least one ion exchange and at least one acid etching. Cation exchanges are performed in at least one solution of ionizable ammonium salt, at a temperature from 0° to 10° C. Acid etchings are performed with inorganic acids such as hydrochloric acid, nitric acid, hydrobromic acid, perchloric acid or organic acids such acetic acid or benzoic acid, for example, at temperatures ranging from 0° to 150° C. The obtained product has a diffraction spectrum corresponding to that of offretite with crystalline parameters of the following size: a from 1.285 to 1.315 nm and c from 0.748 to 0.757 nm (1 nm=10$^{-9}$ m), a benzene absorption capacity higher than 5% and preferably higher than 6% (conditions specified hereinafter), a secondary microporosity, measured by the BJH method, from 3 to 5 nm and corresponding to about 5-50% of the zeolite total pore volume (the BJH method is explained hereinafter).

TABLE A

| 2 Theta | d (nm) | Intensity | 2 theta | d (nm) | Intensity |
|---|---|---|---|---|---|
| 7.65 | 1.153 | 100 | 27.00 | 0.330 | 19 |
| 11.70 | 0.755 | 14 | 28.35 | 0.315 | 26 |
| 13.40 | 0.661 | 29 | 30.55 | 0.292 | 4 |
| 14.05 | 0.629 | 8 | 31.40 | 0.284 | 100 |
| 15.45 | 0.573 | 16 | 33.50 | 0.267 | 13 |
| 19.45 | 0.456 | 27 | | | |
| 20.55 | 0.432 | 41 | | | |
| 23.36 | 0.380 | 31 | | | |
| 23.72 | 0.375 | 78 | | | |
| 24.85 | 0.358 | 41 | | | |

X-ray diffraction diagram of a K-TMA offretite (9.9% by weight K+) having a SiO$_2$/Al$_2$O$_3$ molar ratio of 8.

Crystalline parameters: $\vec{a}$=1.322 nm; $\vec{c}$=0.752 nm

Characterization The obtained offretite of high silica content has been characterized by the following techniques:

X-ray diffraction

The apparatus and methods are disclosed in the European patent 190 949 to the applicant.

Water absorption

Each sample is activitated by preheating at 425° C. for 16 hours under a pressure of 5×10$^{-3}$ mmHg in a conventional apparatus of Mc Bain type.

Then the temperature of the sample is adjusted to the desired value (25° C.) and the sample is contacted with steam at the desired pressure (P/P$_0$=0.1).

Benzene adsorption

This test is performed with the same type of apparatus and the same type of activation than for measuring water adsorption. The sample temperature is set at 25° C. and the benzene pressure at about 70 bars. The adsorption time is set at 4 hours.

Microporosity

The microporosity is determined by the BJH technique (BARRET, JOYNER, HALENDA, J. Am. Chem. Soc. 73, 373 (1951)) based on digital processing of the nitrogen desorption isotherm; the total pore volume is considered at a nitrogen pressure such that P/P$_o$=0.9, P being the nitrogen partial pressure in the measurement conditions and P$_o$ the nitrogen saturating vapor pressure at the temperature of measurement.

The potassium, sodium, silicium and aluminum determinations have been performed by chemical analysis.

Obtainment of the product

The starting product is a synthetic offretite containing TMA (tetramethammonium) and K+ ions (K+ being close to 10% by weight) or TMA, K+ and Na+ (0.5<K/Na+K<0.8) whose silica-to-alumina molar ratio ranges from 4 to 10.

The offretite according to the present invention, having a silica-to-alumina molar ratio of at least 15 has been obtained by subjecting an offretite, partially exchanged by the conventional technique of cations exchanges of the prior art, to at least one cycle, preferably at least two successive cycles of thermal treaments-liquid phase treatments, as above-described.

The type of operations performed on an offretite containing TMA and potassium ions (9.9% by weight) is as follows:

(1) According to the prior art techniques a product of potassium content from 1.5 to 3% by weight is first prepared, a potassium content of less than 1.5% by weight being not possible to obtain by this technique. The method comprises the steps of:

Removing TMA cations by roasting in air, at flow rates from 0.01 to 100 l/h/g, preferably from 0.5 to 10 l/h/g and at temperatures preferably from 450° to 650° C. for more than half an hour.

Performing at least 3 cation exchanges, according to the conventional technique, at temperatures from 0° to 150° C., with a ionizable ammonium salt such as nitrate, sulfate, chloride, ammonium acetate, of molarity higher than 0.1 M, preferably higher than 1 M and more generally lower than 3 M; these exchanges are performed with a ratio of solution volume to the weight of dry solid (V/P) higher than 2, preferably higher than 3, generally lower than 20 and often even lower than 10.

The solid obtained by this series of cation exchanges contains about 1.5–3% by weight of potassium.

(2) From the product obtained by the above-described prior art method, an offretite of increased silica content, of silica-to-alumina molar ratio higher than 10, is prepared by at least one cycle of the following operations:

Roasting in air, preferably containing 5–100% of steam, at flow rates from 0.01 to 100 l/h/g, preferably from 0.5 to 10 l/h/g, at temperatures ranging from 400° to 900° C., preferably from 500° to 800° C., for at least 0.5 hour, preferably more than one hour.

The roasting in moist air may be replaced by a roasting in a static atmosphere, i.e. in the absence of any gas flow, the moistness originating from the product itself. This procedure may be called self-steaming or roasting in confined atmosphere.

At least one cation exchange in the above-described conditions or at least one acid etching at temperatures from 0° to 150° C., with an inorganic acid such as hydrochloric acid, nitric acid, hydrobromic acid, sulfuric acid, perchloric acid, or with an organic acid such as acetic acid or benzoic acid (of normality higher than 0.1 N and preferably from 0.5 to 5 N), with a V/P ratio higher than 2 and preferably higher than 3, generally lower than 50 and often lower than 10, for periods longer than 10 minutes.

The process generally comprises at least one cation exchange and at least one acid exchange.

The acid etching may be performed under controlled conditions, according to the following procedure: the solid is first suspended into distilled water at a temperature from 0° to 150° C.; then the necessary theoretical acid amount for extracting the desired aluminum amount (3 H+ protons per aluminum) is added dropwise. Preferably H+ ions are less than the total aluminum amount contained in the solid. After acid addition, stirring is continued for more than half an hour. A modified offretite according to the invention, of a $SiO_2/Al_2O_3$ molar ratio higher than 15 is thus obtained from an offretite having a $SiO_2/Al_2O_3$ molar ratio ranging from 4 to 10, containing 1.5–3% potassium, by the following operation cycle, performed after previous cation exchange:

roasting in moist air or self-steaming,
treatment with an acid, and/or further by the following operation cycle:

roasting in moist air or self-steaming,
cation exchange with ammonium ions,
roasting in moist air or self-steaming,
treatment with an acid.

It is hence possible that the first liquid phase treatment be an acid etching. However, the latter must be conducted with much care, i.e. at a not too low $p_H$ value and a not too high temperature in order to preserve the solid crystallinity. Generally, particularly for starting offretites of relatively low $SiO_2/Al_2O_3$ molar ratio, the first liquid phase treatment is preferably a cation exchange. It is also possible to perform a liquid phase treatment consisting of a mixed cation exchange/acid etching treatment by admixing an acid with an ammonium salt.

The optimization of the method, the selection of the one or more first liquid phase treatments, the number of roasting-liquid phase treatment cycles to perform, depend on the initial $SiO_2/Al_2O_3$ molar ratio, acting on the product stability, and on the final $SiO_2/Al_2O_3$ molar ratio. Thus the number of operations required for obtaining a given $SiO_2/Al_2O_3$ ratio will be higher as the initial ratio is low and the final ratio high.

The acid offretites of increased silica content according to the present invention are characterized by the following properties:

$SiO_2/Al_2O_3$ molar ratio higher than about 15 and lower than about 500, crystalline parameters $\vec{a}$ and $\vec{c}$ such that $\vec{a}$ ranges from about 1.285 to 1.315 nm and $\vec{c}$ from about 0.748 to about 0.757 nm, potassium content lower than 1.5% by weight, preferably with, in addition:

benzene adsorption capacity at 25° C., under a partial pressure of 70 torrs (133.32×70 Pa) higher than 5% by weight, existence of a secondary microporosity, as measured by the BJH method, within 3–5 nm and corresponding to about 5–50% of the zeolite total pore volume, which is determined by nitrogen adsorption for a $P/P_o$ ratio of 0.9.

It has been observed that the more stable catalysts contained offretites of highly increased silica content. More precisely these offretites have the following characteristics:

$SiO_2Al_2O_3$ molar ratio higher than about 20 and preferably higher than about 30 (particularly from 20 to 400 and more particularly from 30 to 300), crystalline parameters $\vec{a}$ and $\vec{c}$ such that $\vec{a}$ ranges from about 1.290 to about 1.310 nm and preferably from about 1.294 to about 1.300 nm and $\vec{c}$ ranges from about 0.750 to about 0.755 nm, potassium content lower than 1% by weight, preferably lower than 0.5% by weight, preferably with, in addition:

benzene adsorption capacity at 25° C. under a partial pressure of 70 torrs, higher than 5 and preferably higher than 6% by weight, water adsorption capacity, at 25° C. for a $P/P_o$ ratio of 0.1, lower than 18% and preferably lower than 13% by weight, existence of a secondary microporosity, measured by the BJH method, within 3–5 nm and corresponding to about 5–50% of the zeolite total pore volume.

Obviously, the modifying treatments just described for offretite may be applied to all the structures of erionite-offretite type and particularly to ZSM-34 zeolite.

The catalyst according to the invention contains:

(a) 20–95%, preferably 30–80% and advantageously 50–80% by weight of at least one matrix (constituent A), (b) 1–60%, preferably 4–50% and more advantageously 10–40% by weight of at least one zeolite of open structure other than offretite (constituent B); according to the present invention, the term zeolite of open structure designates a zeolite whose main dodecagonal channels have an opening of such a size that it is equivalent to a circular opening of at least 7 Angström diameter, (c) 0.5–60%, preferably 1–40% and more advantageously 2–30% of at least one offretite whose dodecagonal channels have an opening lower than 7 Angströms (constituent C), having a $SiO_2/Al_2O_3$ molar ratio from about 15 to about 500, crystalline parameters of elementary mesh $\vec{a}$ and $\vec{c}$ such that $\vec{a}$ ranges from 1.285 to 1.315 nm and $\vec{c}$ from 0.748 to 0.757 nm and a potassium content lower than 1.5% by weight, the total alkali metal content being preferably lower than 1.5% by weight.

The sum of the percentages by weight of constituents A, B and C of the catalysts is always 100%.

Constituent A of the catalyst according to the invention comprises at least one matrix generally selected from the group formed of alumina, silica, magnesia, clay, titanium oxyde, zirconia, a combination of at least two of said compounds and alumina-boron oxide combinations.

Examples of combinations of at least two compounds of the above group are silica-alumina and silica-magnesia.

Examples of preferred constituent A are silica, alumina, magnesia, silica-alumina and silica-magnesia mixtures.

Constituent B of the catalyst according to the invention comprises at least one zeolite of open structure having dodecagonal channels of at least 7 Angström opening, generally selected from the group formed of X, Y, L, omega and beta zeolites. Zeolites of faujasite structure, particularly Y zeolite, preferably stabilized, currently called ultrastable or USY, or zeolites of increased silica content such as LZ210 zeolite disclosed in U.S. Pat. Nos. 4 403 023 and 4 534 853 and in European patents 139 291 and 124 120, are preferably used, either at least partially exchanged with cations of alkaline-earth mainly cations of rare-earth metals having an atomic number ranging from 57 to 71 inclusive, or in hydrogen form.

Constituent C of the catalyst according to the invention (different from constituent B) comprises at least one offretite selected from the above-defined offretites. The offretite may used in a hydrogen form, hence pratically containing no metal except the very small amount of alkali metal cations (mainly potassium) which are residual cations originating from the zeolite synthetis. The offretite may also be at least partly exchanged with multivalent metal cations; a part of the cation sites of the alumino-silicate structure is then occupied by these cations; such cations are for example cations of alkaline-earth metals, preferably cations of rare-earth metals of atomic number from 54 to 71 inclusive, more particularly lanthanum; these cations being destined to block the structural evolution of the specific offretite used which is liable to occur in the severe operating conditions of the cracking industrial unit regenerator.

The modified offretite, used for the preparation of the catalyst according to the invention, such as above-described, is an offretite whose alumino-silicate structure consists exclusively of aluminum atoms and silicon atoms. However, it is also possible to prepare the catalyst according to the invention from a modified offretite, such as above-described, wherein a part of the aluminum and/or silicon of the aluminosilicate structure is replaced, at the end of the synthesis, by other elements, metals or metalloids, such for example as B, P, Ti, V, Cr, Fe, Mn, Ga, Ge and Zr.

The catalyst of the present invention may be prepared by any method of the prior art.

Thus the catalyst may be obtained by simultaneous incorporation of offretite and zeolite of open structure with a matrix, according to conventional methods of manufacturing zeolite-containing cracking catalysts. The catalyst may also be obtained by mechanical mixing of a product comprising a matrix and a zeolite of open structure, such for example as a Y zeolite, and a product comprising the above-described modified offretite which is for example a mixture of said offretite with a matrix; the offretite-matrix mixture generally contains 1-90% by weight and preferably 5-60% by weight of offretite in proportion to the total mixture weight.

The mixture matrix-zeolite of open structure used for preparing the catalyst according to the invention is generally a conventional cracking catalyst according to the prior art (for example a commercial catalyst); the above-described modified offretite used to manufacture the catalyst of the invention may thus be considered as an additive which may be used as such, in view of being admixed with the above-defined conventional cracking catalyst, or may be previously incorporated with a matrix, the assembly formed by the matrix and the modified offretite,, thus constituting the additive which is admixed with the above-defined conventional cracking catalyst, for example, after adequate shaping, by mechanical mixing of particles containing the modidied offretite with particles of conventional cracking catalyst.

The general conditions of the catalytic cracking reactions are well known (see for example U.S. Pat. Nos. 3,293,192, 3,449,070, 4,415,438, 3,518,051 and 3,607,043) and need not to be repeated here.

In order to produce the greatest possible propylene amount, it may be advantageous to slightly increase the cracking temperature, for example by about 5°-30° C. Generally the catalyst according to the invention is however sufficiently active to make this temperature increase unnecessary. The other cracking conditions are the same as those of the prior art.

According to an alternative embodiement of the invention, the above-described catalyst may be subjected to modifications for a better adaptation to catalytic cracking, in order to increase the octane number of the gasoline produced by cracking.

Cracking processes are of common use in the oil industry. They consist of splitting hydrocarbon molecules of high molecular weight and high volume point to smaller molecules boiling in a lower temperature range, convenient for the desired use.

The so-called Fluid Catalytic Cracking, in short FCC, process has been briefly described above. In this type of process, the hydrocarbon charge is vaporized by contact at high temperature with a cracking catalyst maintained in suspension in the charge vapors. After the desired molecular weight has been reached by cracking, acccompanied with a corresponding decrease of the boiling point, the catalyst is separated from the obtained product, stripped, regenerated by combustion of the formed coke and then again contacted with the charge to be cracked.

New FCC processes comprise the use of two regeneration zones wherethrough circulates the used catalyst.

The charges to be cracked are usually introduced into the reaction zone at a temperature generally from 480° C. to 540° C., under a relative pressure of 0.7-3.5 bars, whereas the temperature of the regenerated catalyst supplied to said zone may be of about 600°-950° C.

The catalyst is fed at the bottom of the riser in an amount adjusted for example by the opening or closing of a valve. The catalyst particles are then conditioned and speeded up towards the riser top, by injecting a gas at the bottom thereof. This injection is performed by means of a fluid distributor. The charge to be cracked is introduced at an upper level and at least partly vaporized by means of an appropriate device in the dense flow of catalyst particles.

The riser top opens into an enclosure, for example concentric thereto, wherein the cracked charge is separated and the used catalyst is stripped. The catalyst is separated from the effluent, driven by a cyclone system and then purified.

The hydrocarbon charges to be fed to units of the above-described type may contain hydrocarbons having boiling points from 200° to 550° C. or more and their density may vary from 30° to 35° API. These charges may be heavy charges containing hydrocarbons whose boiling point may reach 750° C. or more and whose density may range from 10° to 35° API, or even from 0° to 25° API.

Examples of such charges are those having final boiling points of about 400° C., such as vacuum gas-oil and also heavier hydrocarbon oils such as crude and/or stabilized oils, and straight-run or vacuum residues. These charges are optionally subjected to a previous treatment such for example as a hydrotreatment in the presence of catalysts, for example of cobalt-molybdenum or nickel-molybdenum type.

Said charges are optionally diluted with hydrocarbon cuts previously subjected to cracking, which are recycled, as for example light cycle oil (L.C.O.) and/or heavy cycle oil (H.C.O.) and/or the unconverted heavier fraction generally boiling above 500° or 550° C., commonly called slurry. According to a preferred embodiment, these charges are available and preheated within a temperature range from 300° to 450° C. before their treatment.

The improved catalyst used according to the present invention provides for an improved flexibility in the structure of the product yields and the quality of the gasoline cut, i.e. the Research and Motor octane numbers of the latter.

It must be recalled, as a general rule, that, in the domain of catalytic cracking the operation of the process depends in particular on the nature of the desired hydrocarbon effluents in relation with the prevailing refining objects. Thus, by catalytic cracking of an oil, it is generally possible to obtain:

light gases (hydrogen, $C_1$–$C_2$ hydrocarbons),
propylene,
propane ($C_3$),
saturated $C_4$ and iso-$C_4$ hydrocarbons,
$C_4$ unsaturated hydrocarbons,
gasolines,
light cycle oil or light diluent (L.C.O.),
a heavy cycle oil or heavy diluent (H.C.O.),
a residue or slurry, generally freed of catalyst particles, for obtaining a clarified oil (C.O.) or a decanted oil (D.O.).

It may be desired to obtain, by catalytic cracking, an increased amount of liquified petroleum gases ($C_3$–$C_4$ or LPG) and more particularly an increased amount of propylene or even butenes and/or isobutane. On the other hand, it is well known that the general tendency is to reduce the amount of lead-containing additives in gasolines used as motor-fuels, thus requiring the production, particularly by catalytic cracking, of gasolines having improved Clear and Research octane numbers. Accordingly, it may be convenient either to substantially increase the production of unsaturated $C_3$ (propylene) without increasing the production of $C_4$ hydrocarbons and of saturated dry gases ($H_2$, $C_1$, $C_2$), or to substantially improve the production of unsaturated $C_3$ (propylene) and iso-$C_4$ without noticeably increasing the production of saturated dry gases ($H_2$, $C_1$, $C_2$), or to substantially increase the production of unsaturated $C_3$ (propylene) and optionally of $C_4$, particularly unsaturated $C_4$, without increasing the production of saturated dry gases ($H_2$, $C_1$, $C_2$). In all of these three options it is more often desired to further obtain a maximum production of gasoline of particularly high octane number. The two last options and the octane number increase are the object of the present application and may be obtained by using a new specific catalytic cracking catalyst.

Several of these objects, particularly a noticeable improvement of the gasoline quality and an increase of the yields to propylene, butenes and isobutane, can be simultaneously obtained with said specifically adapted catalyst.

The process according to the invention consists of adding to the main constituent, which contains at least one zeolite of faujasite structure (X or Y zeolite) a small amount of a zeolite whose main pores have a smaller opening than that of faujasite, smaller than 7 Angströms and for example ranging from 0.60 to 0.68 nm.

Among zeolites adapted to form a catalyst which improves the yields to $C_3$ and $C_4$ light products, particularly the yields to propylene, butenes and isobutane, and overall to increase very substantially the Research and Motor octane numbers (RON and MON) of gasoline, it has been surprisingly discovered that zeolites of the erionite family, such as erionite, offretite or zeolites related thereto, such as ZSM-34 or AG2, N-O, ZKU zeolites or still zeolites formed of erionite and offretite (T erionite for example) mixed crystals have these properties. Thus, they provide for clearly increased yields of propylene, butenes and isobutane and gasoline octane numbers clearly higher than those obtained by using conventional cracking zeolite catalyst, particularly when used as additive to the latter. Among said zeolites of the erionite family, it has been further discovered that the stabilized and dealuminated offretite,s particularly characterized by a silica-to-alumina molar ratio of at least 15, provide particularly efficient catalysts. One of the zeolites preferred according to the invention is a stabilized and dealuminated offretite. It is obtained by means of modifying treatments for adjusting at will the aluminum and silicium contents of its aluminosilicate structure. Its preparation has been disclosed in the European patent application 190 949.

According to the present invention, zeolites of the modified acid offretite type have been used to prepare a catalyst for cracking hydrocarbon charges, providing for an improved quality (higher gasoline octane numbers) and an improved production of $C_3$ and $C_4$ hydrocarbons, particularly of propylene, butenes and isobutane.

The offretite has been described above.

The specific catalyst used according to the invention contains a mixture of matrix, of zeolite with open structure and of zeolite of the erionite family. Such a catalyst may be prepared by any method known in the art, as above indicated.

As already mentioned, the mixture of matrix and zeolite of open structure used for preparing the catalyst according to the invention is generally a conventional cracking catalyst of the prior art (for example a commercial catalyst). The zeolite may be a X, beta, omega zeolite, mainly a Y zeolite, more particularly an ultrastable Y zeolite, enriched for example with at least one metal of the rare-earth family, or a new Y zeolite enriched with silica by chemical treatments, called LZ210 and disclosed in particular in U.S. Pat. Nos. 4 503 023 and 4 534 853 and in European patents 139 291 and 124 120. The zeolite of the erionite family, for example an offretite, used to manufacture the catalyst of the invention, may then be considered as an additive admixed to the above-defined conventional cracking catalyst, or may be previously incorporated with the matrix, the matrix-offretite assembly thus forming the additive which is admixed to the above-defined conventional cracking catalyst, after adequate shaping, by mechanical mixing of particles containing for example offretite with conventional cracking catalyst particles.

Although all the zeolites of the erionite family, particularly offretite, ZSM-34, AG2, N-O or ZKU zeolites or still T erionite, may be convenient for the present invention, it has been discovered that the most efficient catalysts for selectively producing propylene contained offretites of highly increased silica content. More precisely, these offretites have the following characteristics:

$SiO_2/Al_2O_3$ molar ratio higher than about 15 and preferably higher than about 20 (particularly from 15 to 500, and more particularly from 20 to 300), crystalline parameter $\vec{a}$ ranging from about 1.285 to 1.315 nm, preferably from about 1.290 to about 1.310 nm, and crystalline parameter $\vec{c}$ from about 0.748 to about 0.757 nm, potassium content lower than 1.5% by weight and preferably lower than 0.5% by weight, and in addition:

nitrogen adsorption capacity, at 77 K and at a $P/P_0$ ratio of 0.19, higher than 0.15 cc liquid per gram and preferably higher than 0.20 cc liquid per gram, cyclohexane adsorption capacity, at 25° C. and at a $P/P_0$ ratio of 0.25, higher than 3 and preferably higher than 4% by weight, water adsorption capacity, at 25° C. for a $P/P_0$ ratio of 0.1, lower than 15% and preferably lower than about 10% by weight.

Preferably these offretites have a secondary microporosity, measured by the BJH method (defined in European patent 190 949) ranging from 3 to 5 nm and corresponding to about 5–50% of the zeolite total pore volume.

Obviously, the modifying treatments used for offretite may be applied to any structure of the erionite-offretite type, particularly to ZSM-34 zeolite and to AG-2, N-O, ZKU and T erionite zeolites.

The specific catalyst used according to the invention for increasing the octane number of gasoline produced by cracking, contains:

(a) 20–95%, preferably 30–80% and more advantageously 50–80% by weight of at least one matrix (constituent A), (b) 1–70%, preferably 4–60% and more advantageously 10–50% by weight of at least one zeolite of open structure other than a zeolite of the erionite family (constituent B). It is recalled that the term zeolite of open structure, as used in the present invention, means a zeolite whose main dodecagonal channels have an opening of such a size as to be equivalent to a circular opening of at least 7 Angström diameter, (c) 0.05–40% preferably 0.1–30% and more advantageously 0.5–10% by weight of at least one zeolite of the erionite family (offretite, ZSM-34, AG2, N-O, ZKU or T erionite for example) having a potassium content lower than 4% by weight, the total alkali metal content being preferably lower than 4% by weight (constituent C).

The sum of the percentages by weight of constituents A, B, C contained in the catalyst is always 100%.

When the zeolite of the erionite family is added to the main catalyst as spherical particles separate therefrom but of the same granulometry, the weight of zeolite of the erionite family ranges from 1 to 90% (preferably from 5 to 60%) of the weight of said particles (other than those of the main catalyst).

Constituents A and B have been above defined.

Constituent C of the specific catalyst according to the invention preferably mainly contains at least one offretite whose main dodecagonal channels have an opening of less than 6.8 Angströms (constituent C) whose $SiO_2/Al_2O_3$ molar ratio ranges from about 15 to about 500, the crystalline parameters $\vec{a}$ and $\vec{c}$ of the elementary mesh being from 1.285 to 1.315 nm for $\vec{a}$ and from about 0.748 to 0.757 nm for $\vec{c}$, and the potassium content lower than 1.5% by weight, the total alkali metal content being preferably lower than 1.5% by weight. All other informations concerning constituent C have been indicated above.

EXAMPLES

The following examples illustrate the invention without limiting the scope thereof.

EXAMPLE 1 (COMPARATIVE)

Preparation of an offretite catalyst constituent not conforming with the invention 200 g of synthetic offretite whose opening of the main dodecagonal channels is 6.4 Angströms (W. MEIER and D. H. OLSON, Atlas of Zeolite Structure Types, 19781, having a $SiO_2/Al_2O_3$ molar ratio of 8, containing 9.9% by weight of potassium and 2.8% by weight of tetramethylammonium ions, have been roasted under a stream of a 80% nitrogen and 20% air mixture, flowing at a rate of 3 l/h/g, for 2 hours at 500° C., in order to remove the $TMA^+$ cations.

The obtained product (referenced P) has then been exchanged three times with a 2 M ammonium nitrate solution, at 100° C. for 4 hours, under stirring, with a ratio of solution volume to the dry solid weight (V/P) equal to 5 cc $g^{-1}$.

The obtained solid, referred to as 1A, contains 2.8% by weight of sodium and has a $SiO_2/Al_2O_3$ molar ratio of 8; its structural characteristics are given in Table 2 hereinafter. Solid 1A is called product 1. The diffraction diagram of product 1 ($NH_4^-$ offretite) is reported in Table I below.

The opening of the main dodecagonal channels of offretite was not modified by the treatments.

TABLE I

| X-ray diffraction diagram of product 1. (1A) | | | | | |
|---|---|---|---|---|---|
| 2 theta | d (nm) | Intensity | 2 theta | d (nm) | Intensity |
| 7.70 | 1.145 | 66 | 28.10 | 0.317 | 10 |
| 11.75 | 0.752 | 7 | 28.40 | 0.314 | 24 |
| 13.40 | 0.661 | 37 | 30.55 | 0.292 | 5 |
| 14.10 | 0.628 | 7 | 31.25 | 0.286 | 62 |
| 15.50 | 0.572 | 18 | 31.50 | 0.284 | 59 |
| 17.85 | 0.496 | 2 | 33.50 | 0.267 | 24 |
| 19.50 | 0.455 | 26 | | | |
| 20.50 | 0.433 | 54 | | | |
| 23.31 | 0.382 | 31 | | | |
| 23.70 | 0.375 | 100 | | | |
| 24.90 | 0.357 | 66 | | | |
| 26.20 | 0.340 | <1 | | | |
| 27.00 | 0.330 | 23 | | | |
| 27.30 | 0.327 | 7 | | | |

EXAMPLE 2

Preparation of an offretite catalyst constituent having a $SiO_2/Al_2O_3$ molar ratio of 25, conforming with the invention (2F or product 2)

Offretite 1A obtained in example 1, which contains 2.8% by weight of potassium, has been subjected to the following operations:

First cycle

Self-steaming at 550° C. for 2 hours (to obtain product 2A), 2 successive cation exchanges with $NH_4NO_3$ 2 M at 100° C. for 4 hours under stirring, the ratio of the solution volume to the weight of dry solid (V/P) being 5 cc $g^{-1}$ (to obtain product 2B).

Second cycle

Self-steaming at 650° C. for 2 hours (to obtain product 2C), cation exchange with NH4NO3 2 M in the same conditions as for obtaining 2B (to obtain product 2D), 2 successive acid etchings by 0.23 N HCl, then by 0.36 N HCl at 100° C. for 4 hours, with a V/P ratio of 10 (to obtain product 2E after the first acid etching and product 2F after the second acid etching).

TABLE 2

|  | 1A | 2A | 2B | 2C | 2D | 2E | 2F |
|---|---|---|---|---|---|---|---|
| $SiO_2/Al_2O_3$ (mol) | 8 |  |  |  |  | 10 | 25 |
| X-RAY DIFFRACTION |  |  |  |  |  |  |  |
| S lines ($10^3$) | 277 | 303 | 323 | 298 | 274 | 290.5 | 285 |
| S bottom ($10^3$) | 203 | 193 | 209 | 240 | 256.5 | 269 | 256 |
| S lines (% S total) | 58 | 61 | 61 | 55 | 52 | 52 | 53 |
| Crystallinity | 100 | 105 | 105 | 95 | 90 | 90 | 91 |
| Paramaters $\vec{a}$ | 13.22 | 13.10 | 13.16 | 13.02 | 13.02 | 13.01 | 13.03 |
| (Angstroms) $\vec{c}$ | 7.52 | 7.50 | 7.51 | 7.51 | 7.51 | 7.51 | 7.52 |

At the end of these various treatments, the crystallinity of product 2F is still excellent (its structural characteristics and its diffraction diagram are reported in Tables 2 and 3), its potassium content is 0.7% by weight, its $SiO_2/Al_2O_3$ molar ratio is 25 and its water adsorption capacity is 15% ($P/P_o=0.1$). Solid 2F is called product 2. The opening of the main dodecagonal channels was not modified by the treatments. Its potassium content is 0.3% by weight; its water adsorption capacity is 5% for a $P/P_o$ ratio of 0.1. It has a secondary microporosity with diameters ranging from 20 to 60 Angströms, corresponding to 0.10 cc/g for a total pore volume of 0.38 cc/g, measured with a $P/P_o$ ratio of 0.9. This solid 3C is called product 3. The opening of the main dodecagonal channels was not modified by the treatments.

TABLE 4

| Products | 1 or 1A | 2 or 2F | 3A | 3B | 3C |
|---|---|---|---|---|---|
| $SiO_2/Al_2O_3$ (mol.) | 8 | 25 |  |  | 67.2 |
| X-RAY DIFFRACTION |  |  |  |  |  |
| S lines ($10^3$) | 277 | 285 | 306 | 316 | 330 |
| S bottom ($10^3$) | 203 | 256 | 248 | 255 | 259 |
| S lines/S total (%) | 58 | 53 | 55 | 55 | 56 |
| Cristallinity | 100 | 91 | 95 | 95 | 97 |
| Parameters $\vec{a}$ | 13.22 | 13.03 | 12.93 | 12.93 | 12.93 |
| (Angstroms) $\vec{c}$ | 7.52 | 7.52 | 7.51 | 7.53 | 7.53 |

TABLE 3

| X-RAY DIFFRACTION DIAGRAM OF PRODUCT 2 |  |  |  |  |  |
|---|---|---|---|---|---|
| 2 Theta | d (nm) | Intensity | 2 theta | d (nm) | Intensity |
| 7.85 | 1.13 | 80 | 24.0 | 0.371 | 44 |
| 11.80 | 0.751 | 7 | 24.95 | 0.356 | 47 |
| 13.60 | 0.650 | 100 | 27.40 | 0.325 | 27 |
| 14.15 | 0.625 | 43 | 28.50 | 0.313 | 20 |
| 15.70 | 0.564 | 33 | 30.95 | 0.289 | 14 |
| 18.00 | 0.492 | 2 | 31.70 | 0.282 | 71 |
| 19.70 | 0.451 | 16 | 33.90 | 0.264 | 22 |
| 20.85 | 0.426 | 57 |  |  |  |
| 23.70 | 0.375 | 29 |  |  |  |

EXAMPLE 3

Preparation of an offretite catalyst constituent conforming with the invention

The offretite 2F, called product 2, obtained in example 2, having a silica-to-alumina molar ratio of 25, has been subjected to the following operations:

self steaming at 750° C. for 2 hours, (product 3A), cation exchange with $NH_4NO_3$ 2 M in the conditions of example 1 (product 3B), acid etching with 0.61 N HCl (V/P=15) at 100° C. for 4 hours (product 3C).

The obtained product 3C, whose $SiO_2/Al_2O_3$ molar ratio is 67, has an excellent crystallinity (its structural characteristics and its diffraction diagram are reported in Tables 4 and 5).

TABLE 5

| X-RAY DIFRACTION DIAGRAM OF PRODUCT 3 (or 3C) |  |  |  |  |  |
|---|---|---|---|---|---|
| 2 theta | d nm | Intensity | 2 theta | d nm | Intensity |
| 7.90 | 1.12 | 100 | 31.85 | 0.281 | 40 |
| 11.80 | 0.751 | 5 | 34.10 | 0.2625 | 13 |
| 13.70 | 0.645 | 90 |  |  |  |
| 14.20 | 0.624 | 39 |  |  |  |
| 15.85 | 0.559 | 20 |  |  |  |
| 18.10 | 0.490 | 1 |  |  |  |
| 19.75 | 0.449 | 15 |  |  |  |
| 21.00 | 0.423 | 36 |  |  |  |
| 23.90 | 0.372 | 18 |  |  |  |
| 24.15 | 0.368 | 22 |  |  |  |
| 24.95 | 0.356 | 25 |  |  |  |
| 27.55 | 0.323 | 15 |  |  |  |
| 28.55 | 0.312 | 9 |  |  |  |
| 31.10 | 0.287 | 7 |  |  |  |

EXAMPLE 4

Preparation of cracking additives essentially comprising offretite obtained according to the preceding examples The various products 1 (or 1A), 2 (or 2F) and 3 (or 3C) are respectively diluted in a proportion of 30% by weight in an amorphous silica of granulometry similar to that of the used offretites.

The various obtained catalytic additives are pelletized, then reduced to small aggregates by means of a crushing machine. The 40–200 micron fraction is then recovered by screening. These additives are respectively called 1, 2 and 3 offretite additives, in short A01, A02 and A03.

EXAMPLE 5 (COMPARATIVE)

Preparation of a cracking additive essentially comprising ZSM5 zeolite, called ZSM5 additive A ZSM5 zeolite having a $SiO_2/Al_2O_3$ ratio of 60 has been synthesized according to the technique disclosed by ARGAUER et al. in U.S. Pat. No. 3,702,886. After controlled roasting, in air at 550° C., for removing the totality of tetrapropylammonium ions, said zeolite is admixed with amorphous silica (identical to that used in example 4), in a proportion of 30% by weight of zeolite; then the resultant solid is pelletized, crushed and screened as precedingly (example 4). The obtained additive is called ZSM5 additive, in short AZ4.

EXAMPLE 6 (COMPARATIVE)

Preparation of a cracking additive essentially comprising mordenite zeolite, called mordenite additive 900 g of sodium mordenite (900 Na zeolon) as extrudates of 1.587 mm (1/16th inch) sold by U.S. Company NORTON, are subjected to two ion exchanges in an ammonium nitrate solution in the following conditions:

| solution volume | 3.6 liters |
|---|---|
| $NO_3NH_4$ concentration of the solution | 2 M |
| exchange time | 1 hour |
| exchange temperature | T = 90° C. |

After each exchange the solid is washed in 1.8 liter of distilled water for 20 minutes at 20° C.

At the end of these operations, the product is dried at 120° C. in a stove for 3 hours. The obtained solid is roasted for 2 hours at 550° C. under a 180 liter per hour flow rate of moist air containing 50% by volume of steam.

The mordenite thus obtained in hydrogen form is dipped into 9 liters of a 0.6 M hydrochloric acid solution and is treated for 2 hours at 90° C. in said solution. After a 10 minute washing in 5.4 liters of distilled water, followed with filtration, the product is dried at 120° C. for 2 hours. The obtained mordenite is roasted in moist air in conditions similar to those above described, except for the temperature which is brought to 600° C.

The obtained solid is dipped into 3.6 liters of a normal hydrochloric acid aqueous solution and is treated for 2 hours at 90° C. in said solution. After a 10 minute washing in 3.6 liters of distilled water at 20° C., the solid is dried at 120° C. for 2 hours.

This solid is then subjected to roasting in moist air in conditions similar to those above described, except for the temperature which is brought to 650° C.

The roasted solid is dipped into 1.8 liters of a 2 N hydrochloric acid aqueous solution and is treated for 2 hours at 90° C. in said solution. It is then washed in 5.4 liters of distilled water, filtered and dried at 120° C. for 2 hours.

The two essential characteristics of the obtained mordenite are:

total $SiO_2/Al_2O_3$ molar ratio = 58.6 residual sodium % by weight = 0.09

This product is diluted in a proportion of 30% by weight in amorphous silica (identical to that used in example 4), then pelletized, crushed and screened as precedingly (example 4). The obtained additive is called mordenite additive, in short AM5.

EXAMPLE 7

Preparation of cracking catalysts, comparative or conforming with the invention, and test conditions for these catalysts The various additives obtained in examples 4 to 6 are mechanically mixed conventionally in a proportion of 20% by weight with a fresh industrial cracking catalyst called in short CAT. This catalyst CAT contains a silica-alumina matrix and 30% by weight of ultra stabilized Y zeolite (USY) having a crystalline parameter of 2.45 nm, and whose main dodecagonal channels have an opening of 7.4 Ångströms (W. MEIER and D. HOLSON, Atlas of Zeolite Structure Types 1978). This catalyst (CAT) was previously roasted for 6 hours at 750° C. in the presence of 100% steam.

Each of the obtained catalysts is then introduced into the reactor of a catalyst test micro-unit MAT. The capacity of this catalyst to convert a heavy hydrocarbon charge is then determined in the following conditions:

| catalyst amount | 6 g |
|---|---|
| catalyst/charge weight ratio (C/O) | 6 |
| charge injection time | 40 seconds |
| weight hourly space velocity (WHSV) | 15 $h^{-1}$ |
| temperature | 510° C. |

The treated charge has the following characteristics:

| density at 15° C. | 0.929 |
|---|---|
| S % by weight | 0.155 |
| N % by weight | 0.1 |
| Conradson carbon % | 3.8 |
| Ni + V | 5 ppm |
| Viscosity at 60° C. (Cst) | 45.2 |
| Refraction index $R_I$ of the charge at 60° C. | 1.5061 |
| saturated | 45.5% by weight |
| olefins | 1.5% by weight |
| aromatics | 42.7% by weight |
| resins | 9.8% by weight |
| asphaltenes (insoluble to $C_5$) | 3.1% by weight |

Comparison of the catalytic performances

The results are expressed as follows:

charge conversion in % by weight gas yield in % by weight ($H_2+C_1-C_4$ hydrocarbons)

gas distribution in % by weight ($H_2+C_1-C_4$ hydrocarbons)

gasoline yield in $C_5$ % by weight at 220° C.

LCO yield (middle distillates: 220°–380° C.) in % by weight coke yield in % by weight The results obtained by the various catalysts and the industrial cracking catalysts are summarized in Table 6 hereinafter.

TABLE 6

| CATALYSTS | CAT* | CAT + AO1* | CAT + AO2 | CAT + AO3 | CAT + AZ4* essentially of ZSM5 | CAT + AMS* essentially of mordenite |
|---|---|---|---|---|---|---|
| Conversion | 67.7 | 67.3 | 69.4 | 69.8 | 65.7 | 65.0 |
| Total gas | 19.4 | 20.4 | 23.9 | 25.0 | 20.3 | 20.1 |
| Gasoline | 40.5 | 39.1 | 37.6 | 37.2 | 37.9 | 37.0 |
| LCO | 20.7 | 19.0 | 18.9 | 18.8 | 20.1 | 20.7 |
| Coke | 7.8 | 7.8 | 7.9 | 7.6 | 7.5 | 7.9 |
| $H_2$ | 0.06 | 0.05 | 0.05 | 0.05 | 0.06 | 0.06 |
| $C_1 + C_2$ | 1.7 | 1.7 | 1.8 | 1.6 | 1.9 | 1.7 |
| $C_3$ saturated | 1.4 | 1.8 | 2.7 | 2.8 | 2.1 | 1.7 |
| $C_3$ unsaturated | 5.2 | 6.0 | 7.9 | 9.1 | 6.1 | 5.9 |
| $C_4$ saturated | 5.3 | 5.2 | 5.6 | 5.5 | 4.9 | 5.1 |
| $C_4$ unsaturated | 5.7 | 5.6 | 5.9 | 5.9 | 5.3 | 5.7 |

*comparison examples

These results show that the catalysts containing AO2 and AO3 offretite additives prepared from dealuminated offretites having respective $SiO_2/Al_2O_3$ ratios of 25 and 67 as well as the other characteristics of the invention, provide clearly improved propylene yields as compared with a conventional cracking catalyst CAT and with catalysts containing AZ5 additives including ZSM5 or AM5 zeolite containing a mordenite not conforming with the invention.

EXAMPLE 8

Preparation of offretite OFF1 having a $SiO_2/Al_2O_3$ molar ratio of 52

The solid 1A, not conforming with the invention, as prepared in example 1, is subjected to the following successive treatments:

self-steaming at 550° C. for 2 hours (to obtain product 2A), two successive cation exchanges in a 2 M solution of $NH_4NO_3$, at 100° C. for 4 hours, under stirring, with a ratio of solution volume to solid dry weight (V/P) equal to 5 cc.$g^{-1}$ (to obtain product 2B), self-steaming at 650° C. for 2 hours (to obtain product 2C), 2 successive cation exchanges in a 2 M solution of $NH_4NO_3$, at 100° C. for 4 hours, under stirring, with a ratio of solution volume to solid dry weight (V/P) equal to 5 cc.$g^{-1}$ (to obtain product 2D), acid etching in a 1 N solution of HCl at 100° C. for 2 hours with a ratio of solution volume to the weight of dry solid equal to 15 cc.$g^{-1}$.

The obtained solid is referred to as OFF1. It has the following characteristics:

| | |
|---|---|
| $SiO_2/Al_2O_3$ ratio (mole) | 52 |
| % K | 0.13 by weight |
| Crystalline parameters | |
| $\bar{a}$ | 13.01 Angstroms |
| $\bar{c}$ | 7.53 Angstroms |
| Cristallinity (DX) | 91% |
| Micropore volume $N_2$ | 0.28 cc.$g^{-1}$ |
| Water adsorption capacity (by weight) | 3% |
| Cyclohexane adsorption capacity (by weight) | 7% |

As indicated by the preceding characteristics, solid OFF1 is a dealuminated offretite of $SiO_2/Al_2O_3$ ratio equal to 52, well crystallized and having a very low potassium residual content and a high micropore volume.

EXAMPLE 9

Preparation of offretite OFF2 having a $SiO_2/Al_2O_3$ molar ratio of 105

The product referenced OFF1, as obtained in example 8, is subjected to the following treatments:
self-steaming at 750° C. for 2 hours,
acid etching in 3 N HCl at 100° C., for 4 hours, with a ratio of solution volume to dry solid weight (V/P) of 15 cc.$g^{-1}$.

The obtained solid, referenced OFF2, has the following characteristics:

| | |
|---|---|
| $SiO_2/Al_2O_3$ | 103 |
| K (by weight) | 0.04% |
| Crystalline parameters | |
| $\bar{a}$ | 12.97 Angstroms |
| $\bar{c}$ | 7.54 Angstroms |
| Crystallinity (DX) | 87% |
| Micropore volume $N_2$ | 0.27 cc.$g^{-1}$ |
| Water adsorption capacity (by weight) | 1.1% |
| Cyclohexane adsorption capacity (by weight) | 6.8% |

As solid OFF1, solid OFF2 is a much dealuminated offretite of $SiO_2/Al_2O_3$ molar ratio equal to 105, well crystallized, of low potassium residual content and of high micropore volume.

EXAMPLE 10 (NOT CONFORMING WITH THE INVENTION)

Cracking performed over a reference industrial balanced catalyst (CAT E)

A catalytic cracking test is performed with a hydrocarbon charge whose characteristics are given in table 7. The used industrial balanced catalyst (called CAT E) contains 70% of a conventional matrix, essentially formed of alumina of high silica content and of kaolin, and containing 30% of USY ultrastable Y zeolite. It has the following characteristics:

| | |
|---|---|
| surface in $m^2.g^{-1}$ | 110 |
| rare-earth oxide in % by weight | 1.6. |
| $Na_2O$ (% by weight) | 0.3 |
| V (ppm) | 4800 |
| Ni (ppm) | 2800 |
| Fe (ppm) | 10200 |

This catalyst CAT E is placed into a reactor of a test micro-unit (also called micro-activity test unit, in short MAT) and contacted with the hydrocarbon charge in the following test conditions:

| T | 520° C. |
|---|---|
| C/O | 5–6.5 (*) |
| catalyst amount | 5 g |
| injection time | 40 seconds |

(*) In all the following examples, the C/O ratio will be calculated by taking only into account the reference catalyst, irrespective of the eventual presence of additive (mainly consisting of offretite). In other terms, C = weight in grams of the reference catalyst CAT E.

(+) In all the following examples, the C/O ratio will be calculated by taking only into account the reference catalyst, irrespective of the eventual presence of additive (mainly consisting of offretite). In other terms, C=weight in grams of the reference catalyst CAT E.

The Re search and Motor octane numbers of light of heavy gasolines are calculated from detailed chromatography analyses of the $C_5^+$ liquid effluent recovered at the reactor output at the end of the catalyst test.

The results are reported in Table 8 hereinafter.

TABLE 7
CHARACTERISTICS OF THE HEAVY CHARGE

| Density (20° C.) | 0.968 |
|---|---|
| Viscosity (solid at 60° C.) | |
| (80° C.) | 119.8 |
| cSt (100° C.) | 52.2 |
| Conradson (% by weight) | 5.1 |
| Na ppm | 2 |
| Ni ppm | 12 |
| V ppm | 1 |
| C (% by weight) | 86.9 |
| H (% by weight) | 12.2 |
| N (% by weight) | 0.35 |
| S (% by weight) | 0.21 |
| N basic (% by weight) | 0.055 |
| C aromatic (% by weight) | 22.3 |
| H aromatic (% by weight) | 2.7 |
| Simulated Distillation (°C.) | |
| 5% by weight | 367 |
| 10% by weight | 399 |
| 20% by weight | 436 |
| 40% by weight | 495 |
| 60% by weight | 575 |
| Final boiling point | 575 |

TABLE 8

| Catalyst | CAT E | | |
|---|---|---|---|
| Test N° | 1 | 2 | 3 |
| C/O* (% by weight) | 5.0 | 5.5 | 6.5 |
| Conversion | 62.36 | 69.69 | 73.60 |
| $C_1$–$C_4$ | 12.75 | 16.63 | 17.98 |
| ($C_5$-150) Gasoline | 30.22 | 33.39 | 32.93 |
| (150–221) Gasoline | 11.13 | 11.63 | 10.49 |
| Total Gasoline | 41.35 | 45.02 | 43.42 |
| LCO (221–350) | 15.68 | 14.45 | 12.50 |
| Slurry (350+) | 21.97 | 15.86 | 13.90 |
| Coke | 7.75 | 7.54 | 11.67 |
| $H_2$ | 0.51 | 0.50 | 0.54 |
| $C_1$ | 0.57 | 0.66 | 0.68 |
| $C_2$ | 0.45 | 0.47 | 0.49 |
| $C_2^=$ | 0.60 | 0.77 | 0.84 |
| Total $C_2$ | 1.05 | 1.24 | 1.33 |
| $C_3$ | 0.63 | 1.02 | 1.18 |
| $C_3^=$ | 3.20 | 3.82 | 4.10 |
| Total $C_3$ | 3.83 | 4.84 | 5.28 |
| $iC_4$ | 1.56 | 2.92 | 3.36 |
| $nC_4$ | 0.49 | 0.85 | 0.98 |
| $iC_4^=$ | 1.77 | 1.94 | 2.03 |
| $nC_4^=$ | 3.47 | 4.17 | 4.32 |
| Total $C_4$ | 7.29 | 9.88 | 10.69 |
| light gasoline RON | 92.4 | 92.8 | 93.3 |
| heavy gasoline RON | 88.6 | 88.9 | 89.4 |
| light gasoline MON | 77.9 | 78.3 | 78.5 |

TABLE 8-continued

| Catalyst | CAT E | | |
|---|---|---|---|
| Test N° | 1 | 2 | 3 |
| heavy gasoline MON | 79.2 | 79.5 | 79.9 |

*in C/O, C = weight of catalyst CAT E.

in test 4 of example 12 (table 9), the octane number and gasoline yield differences with respect to test 1 of the preceding example 8, are:

| Gasoline yield | −3.89 |
|---|---|
| Light gasoline RON | +1.8 |
| Heavy gasoline RON | +8.9 |
| Light gasoline MON | +3.6 |
| Heavy gasoline MON | +5.2 |
| Propylene yield | +3.31 (i.e. 3.31/3.20 = 103%) |
| Isobutane yield | +2.40 (i.e. 2.40/1.56 = 154%) |
| Yield of n butenes | +2.0 (i.e. 2/3.47 = 58%) |

These examples show that the addition of small offretite amounts to the conventional cracking catalyst clearly improves the gasoline yield and the propylene and isobutane production, and, to a less extent, the production of normal butenes.

EXAMPLE 13 (CONFORMING WITH THE INVENTION)

A new catalyst consisting of the following mixture of preceding catalyst CAT E and OFF2 offretite-containing additive ($SiO_2/Al_2O_3$=105) is surveyed in the same conditions and with the same charge as precedingly (examples 3 and 5):

CAT E+5% by weight of OFF2

TABLE 9

| | CAT E | | | | |
|---|---|---|---|---|---|
| CATALYST | 2% by weight OFF1 | | 5% by weight OFF1 | | |
| Test N° | 4 | 5 | 6 | 7 | 8 |
| C/O (*) | 5.0 | 5.4 | 4 | 4.8 | 5.5 |
| (% by weight) | | | | | |
| Conversion | 68.89 | 71.36 | 60.99 | 68.47 | 73.10 |
| $C_1$–$C_4$ | 23.29 | 26.08 | 23.91 | 27.62 | 33.26 |
| ($C_5$–150) Gasoline | 28.41 | 27.56 | 24.01 | 24.63 | 23.07 |
| (150–221) Gasoline | 9.04 | 9.00 | 6.26 | 7.03 | 6.19 |
| Total Gasoline | 37.46 | 36.56 | 30.27 | 31.66 | 29.27 |
| LCO (221–350) | 13.38 | 12.01 | 11.26 | 11.90 | 10.87 |
| Slurry (350+) | 17.73 | 16.18 | 27.76 | 19.64 | 16.03 |
| Coke | 7.75 | 8.73 | 6.47 | 8.81 | 10.11 |
| $H_2$ | 0.39 | 0.45 | 0.34 | 0.39 | 0.47 |
| $C_1$ | 0.54 | 0.57 | 0.43 | 0.56 | 0.56 |
| $C_2$ | 0.40 | 0.41 | 0.35 | 0.41 | 0.45 |
| $C_2^=$ | 1.04 | 1.23 | 0.99 | 1.48 | 2.00 |
| Total $C_2$ | 1.44 | 1.64 | 1.35 | 1.88 | 2.46 |
| $C_3$ | 1.48 | 1.96 | 1.46 | 2.11 | 3.37 |
| $C_3^=$ | 6.51 | 7.21 | 6.20 | 7.37 | 8.53 |
| Total $C_3$ | 7.99 | 9.17 | 7.65 | 9.48 | 11.90 |
| $iC_4$ | 3.96 | 4.54 | 3.33 | 4.79 | 5.80 |
| $nC_4$ | 1.12 | 1.32 | 1.06 | 1.41 | 2.04 |
| $iC_4^=$ | 2.78 | 3.02 | 4.25 | 3.78 | 4.16 |
| $nC_4^=$ | 5.46 | 5.82 | 5.84 | 5.72 | 6.35 |
| Total $C_4$ | 13.32 | 14.70 | 14.48 | 15.70 | 18.35 |
| Light gasoline RON | 94.2 | 95.6 | 96.0 | 97.5 | 98.5 |
| Heavy gasoline RON | 97.5 | 98.2 | 93.4 | 98.8 | 99.1 |
| Light gasoline MON | 81.5 | 82.1 | 80.8 | 82.3 | 82.1 |
| Heavy gasoline MON | 84.4 | 85.5 | 82.2 | 85.7 | 85.6 |

*in C/O, C = weight of catalyst CAT E.

The results are reported in Table 10 below.

As compared with the preceding example 11, the use of highly dealuminated OFF2 offretite having a Si/Al atomic ratio of 52.5, much higher than that OFF1 offretite, results in a lower activity (conversion rate of 65.49 instead of about 68.5–69), in a lower propylene production (4.79 instead of about 6.5–7%), in a lower isobutane production (3.14 instead of about 4–4.5), in a higher gasoline production but with lower Research and Motor octane numbers. Nonetheless, as compared with those of example 10, these results clearly show the effect of said offretite for improving the production of propylene, isobutane, and butenes and for improving the Research and Motor gasoline octane numbers.

It is again recalled that, for these results, the value C of the C/O ratio is equal to the weight of the reference catalyst CAT E.

TABLE 10

| Catalyst | Cat E + 5% OFF2 |
|---|---|
| Test N° | 9 |
| C/O (*) | 4.9 |
| (% by weight) | |
| Conversion | 65.49 |
| $C_1$–$C_4$ | 18.93 |
| ($C_5$-150) Gasoline | 28.92 |
| (150–221) Gasoline | 9.72 |
| Total Gasoline | 38.64 |
| LCO (221–350 | 13.91 |
| Slurry (350+) | 20.37 |
| Coke | 7.92 |
| $H_2$ | 0.51 |
| $C_1$ | 0.65 |
| $C_2$ | 0.49 |
| $C_2^=$ | 1.09 |
| Total $C_2$ | 1.58 |
| $C_3$ | 1.09 |
| $C_3^=$ | 4.79 |
| Total $C_3$ | 5.88 |
| $iC_4$ | 3.14 |
| $nC_4$ | 0.87 |
| $iC_4^=$ | 2.12 |
| $nC_4^=$ | 4.69 |
| Total $C_4$ | 10.82 |
| Light Gasoline RON | 94.1 |
| Heavy Gasoline RON | 93.8 |
| Light Gasoline MON | 79.9 |
| Heavy Gasoline MON | 82.1 |

+ in C/O, C = weight of catalyst CAT E.

What is claimed as the invention is:

1. In a process for catalytic cracking of a hydrocarbon charge, comprising subjecting said charge to cracking conditions in the presence of a catalyst, the improvement wherein the catalyst contains:
    (a) 20–95% by weight of at least one matrix, selected from the group consisting of alumina, silica, magnesia, clay, titanium oxide, zirconia, combinations of at least two of these compounds and alumina-boron oxide combinations,
    (b) 1–60% by weight of at least one zeolite of open structure whose main dodecagonal channels have openings of at least 7 Angstroms, said zeolite of open structure being selected from the group formed of X, Y, L, omega and beta zeolites,
    (c) 0.5–60% by weight of at least one dealuminated offretite whose main dodecagonal channels have openings smaller than 7 Angstroms and which has a $SiO_2/Al_2O_3$ molar ratio from about 15 to about 500, the crystalline parameters a and c of elementary mesh ranging respectively from 1.285 to 1.315 nm for a and from 0.748 to 0.757 nm for c and has a potassium content lower than 1.5% by weight, and is prepared by a process comprising:
    (1) preparing a mixture of offretite with a matrix,
    (2) preparing a mixture of a zeolite of open structure with a matrix, and
    (3) admixing the product of (1) with the product of (2).

2. A process according to claim 1, wherein the catalyst contains:
    (a) 30–80% by weight of matrix,
    (b) 4–50% by weight of zeolite of open structure,
    (c) 1–40% by weight of offretite.

3. A process according to claim 2, wherein in the catalyst the zeolite of open structure is: (a) an ultrastable Y zeolite in hydrogen form, (b) the latter zeolite at least partially exchanged with cations of metals from the rare-earth group having an atomic number from 57 to 71 inclusive, of (c) a mixture thereof.

4. A process according to claim 1, wherein the offretite has a $SiO_2/Al_2O_3$ molar ratio from about 20 to about 400, crystalline parameters a and c of elementary mesh respectively from about 1.290 nm to about 1.310 nm for a and from about 0.750 nm to about 0.755 nm for c and a potassium content lower than 1% by weight.

5. A process according to claim 4, wherein the offretite is in hydrogen form.

6. A process according to claim 4, wherein the offretite is at least partially exchanged with cations of metals from the rare-earth group of atomic number from 57 to 71 inclusive.

7. A process according to claim 1, wherein said constituent (c) further contains a minor portion of erionite, ZSM-34, AG2, N-O, ZKU or erionite zeolites.

8. A process according to claim 7, wherein said constituent (c) of the catalyst essentially consists of at least one offretite whose main dodecagonal channels have openings smaller than 6.8 Angströms.

9. A process according to claim 8, wherein the offretite has a nitrogen adsorption capability higher than 0.2 cc of liquid per gram, a cyclohexane adsorption capacity higher than 4% by weight and a water adsorption capacity lower than about 10% by weight.

10. A process according to claim 1, having a benzene adsorption capacity at 25° C., under a partial pressure of 70 torr higher than 5% by weight, and a second microporosity of 3–5 nm and corresponding to about 5–50% of the zeolite total pore volume.

11. A process according to claim 1, wherein in the catalyst component (c) having a $SiO_2/Al_2O_3$ ratio of 30–300, a crystalline parameter a of about 1.294 to 1.300 nm, a crystalline parameter c of about 0.750–0.755 nm, and a potassium content lower than about 0.5% by weight.

12. A process according to claim 11, having a benzene adsorption capacity at 25° C. at a partial pressure of 70 torr higher than about 6% by weight, a water adsorption capacity at 25° C. for a $P/P_o$ ratio of 0.1, lower than 13% by weight, and a secondary microporosity of 3–5 nm corresponding to 5–50% of the zeolite total pore volume.

* * * * *